US009694659B2

(12) United States Patent
Timmermann

(10) Patent No.: US 9,694,659 B2
(45) Date of Patent: Jul. 4, 2017

(54) SEALING ARRANGEMENT FOR A FIXED VEHICLE WINDOW PANE

(71) Applicant: SAINT-GOBAIN GLASS FRANCE, Courbevoie (FR)

(72) Inventor: Alwin Timmermann, Cologne (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/888,323

(22) PCT Filed: Mar. 31, 2014

(86) PCT No.: PCT/EP2014/056409
§ 371 (c)(1),
(2) Date: Oct. 30, 2015

(87) PCT Pub. No.: WO2014/177329
PCT Pub. Date: Nov. 6, 2014

(65) Prior Publication Data
US 2016/0075221 A1    Mar. 17, 2016

(30) Foreign Application Priority Data

Apr. 30, 2013 (EP) .................................... 13165908

(51) Int. Cl.
B60J 10/70 (2016.01)
B60J 10/00 (2016.01)
(Continued)

(52) U.S. Cl.
CPC .......... B60J 10/70 (2016.02); B60J 10/0071 (2013.01); B60J 10/04 (2013.01); B60J 10/30 (2016.02)

(58) Field of Classification Search
CPC .................................. B60J 10/70; B60J 10/30
(Continued)

(56) References Cited

U.S. PATENT DOCUMENTS 3,759,004 A    9/1973  Kent
3,783,568 A    1/1974  Adler et al.
(Continued)

FOREIGN PATENT DOCUMENTS

BE    WO 2013127977 A1 *   9/2013    ............. B60J 10/16
CN    WO 2011160324 A1 *  12/2011    ............. B60J 10/70
(Continued)

OTHER PUBLICATIONS

International Search Report issued for International Application No. PCT/EP2014/062512 filed on Jun. 16, 2014 in the name of Saint-Gobain Glass France. Mail date: Sep. 30, 2014 (English translation + German original).

(Continued)

Primary Examiner — Babajide Demuren
(74) Attorney, Agent, or Firm — Steinfl + Bruno LLP

(57) ABSTRACT

A sealing arrangement for a vehicle window pane is described. The sealing arrangement comprises: a holding rail with a latching channel, wherein the latching channel comprises a guide rail and a spring member; the holding rail is secured on a window pane; a cover with a guide channel, wherein the guide channel is formed by a latching rail and a positioning stop and the guide rail is arranged in the guide channel and the latching rail is latched in the latching channel, wherein the spring member is latch-connected to the latching rail, wherein a spring element is tensioned in the guide channel between an abutment surface on the underside of the cover and the guide rail, wherein the spring element is designed as a single lip in cross-section and, in conjunction with the guide rail, seals and supports the underside of the cover between the positioning stop and the latching rail.

19 Claims, 3 Drawing Sheets

Figure 1:
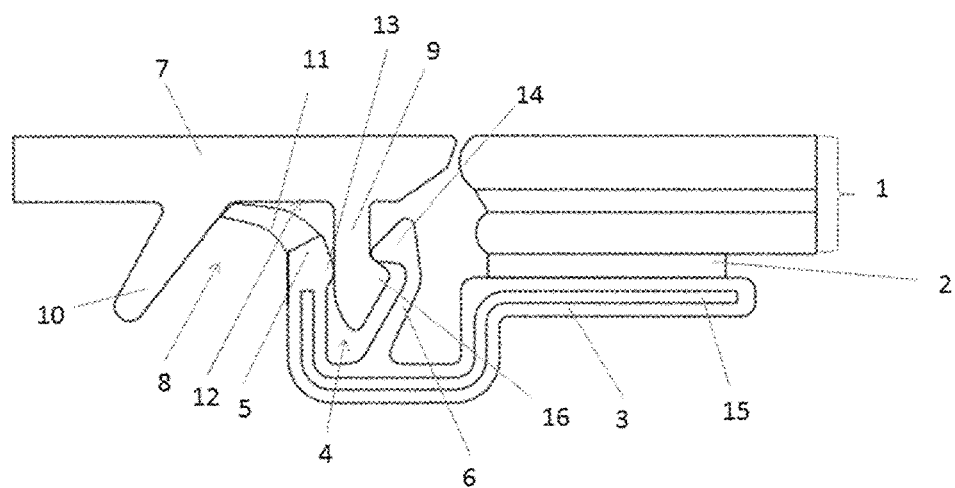

(51) Int. Cl.
*B60J 10/04* (2006.01)
*B60J 10/30* (2016.01)

(58) Field of Classification Search
USPC .................................................. 52/204.599
See application file for complete search history.

(56) References Cited

U.S. PATENT DOCUMENTS

| | | | |
|---|---|---|---|
| 3,843,982 A | 10/1974 | Lane et al. | |
| 4,240,227 A | 12/1980 | Hasler et al. | |
| 4,523,783 A | 6/1985 | Yamada | |
| 4,627,145 A | 12/1986 | Niemanns | |
| 4,650,240 A | 3/1987 | Rinella | |
| 4,683,694 A * | 8/1987 | Ziegler | B60J 10/24 |
| | | | 296/93 |
| 4,823,511 A | 4/1989 | Herliczek et al. | |
| 4,839,122 A | 6/1989 | Weaver | |
| 4,840,001 A | 6/1989 | Kimisawa | |
| 4,950,019 A | 8/1990 | Gross | |
| 4,968,543 A | 11/1990 | Fujioka et al. | |
| 4,994,315 A | 2/1991 | Schreiber et al. | |
| 5,070,590 A | 12/1991 | Fujioka et al. | |
| 5,139,846 A | 8/1992 | Herwegh et al. | |
| 5,214,824 A | 6/1993 | Lesser et al. | |
| 5,421,130 A | 6/1995 | Weber et al. | |
| 5,567,239 A | 10/1996 | Ribic, Jr. | |
| 5,571,276 A * | 11/1996 | Kobos | A47L 15/4265 |
| | | | 312/109 |
| 5,806,257 A | 9/1998 | Cornils et al. | |
| 5,840,401 A | 11/1998 | Baesecke | |
| 5,882,766 A | 3/1999 | Baumann | |
| 5,898,407 A | 4/1999 | Paulus et al. | |
| 5,918,420 A | 7/1999 | Timmermann | |
| 5,950,976 A | 9/1999 | Shibata | |
| 6,364,404 B1 | 4/2002 | De Paoli | |
| 6,460,917 B2 | 10/2002 | De Paoli | |
| 6,722,731 B2 | 4/2004 | Cornils et al. | |
| 6,748,706 B2 * | 6/2004 | Gaiser | B60R 13/07 |
| | | | 52/204.53 |
| 6,769,700 B2 | 8/2004 | Ortmuller et al. | |
| 6,794,882 B2 | 9/2004 | Jessup | |
| 7,806,455 B2 * | 10/2010 | Polke | B60J 10/18 |
| | | | 296/93 |
| 7,870,958 B1 * | 1/2011 | Gross | B65D 81/07 |
| | | | 206/448 |
| 8,251,432 B2 * | 8/2012 | Schaff | B60J 10/18 |
| | | | 296/93 |
| 8,434,267 B2 | 5/2013 | Bocutto | |
| 8,444,205 B2 | 5/2013 | Flammer et al. | |
| 8,449,016 B2 | 5/2013 | Timmermann | |
| 8,628,137 B2 | 1/2014 | Platt et al. | |
| 8,991,893 B2 | 3/2015 | Platt et al. | |
| 9,168,879 B2 | 10/2015 | Timmermann et al. | |
| 2001/0047058 A1 | 11/2001 | Johnson et al. | |
| 2003/0006623 A1 | 1/2003 | Cornils et al. | |
| 2003/0057660 A1 | 3/2003 | Ortmuller et al. | |
| 2003/0066255 A1 | 4/2003 | Cripe | |
| 2004/0035066 A1 | 2/2004 | Leconte | |
| 2006/0165977 A1 | 7/2006 | Rehfeld et al. | |
| 2006/0232093 A1 | 10/2006 | Boehm et al. | |
| 2006/0266460 A1 | 11/2006 | Kreye | |
| 2007/0246966 A1 | 10/2007 | Polke | |
| 2008/0056505 A1 | 3/2008 | Rehfeld et al. | |
| 2010/0320797 A1 * | 12/2010 | Schlater | B60J 10/70 |
| | | | 296/93 |
| 2011/0018303 A1 * | 1/2011 | Timmermann | B60J 10/35 |
| | | | 296/90 |
| 2011/0115261 A1 | 5/2011 | Platt et al. | |
| 2011/0181071 A1 | 7/2011 | Schaff et al. | |
| 2011/0285177 A1 | 11/2011 | Flammer et al. | |
| 2012/0126567 A1 * | 5/2012 | Timmermann | B60J 10/30 |
| | | | 296/96.21 |
| 2012/0153659 A1 | 6/2012 | Senge | |
| 2013/0224011 A1 | 8/2013 | Hashimoto | |
| 2014/0346803 A1 | 11/2014 | Timmermann et al. | |
| 2014/0367989 A1 | 12/2014 | Erner | |
| 2016/0001645 A1 | 1/2016 | Ortmueller | |
| 2016/0075221 A1 | 3/2016 | Timmermann | |

FOREIGN PATENT DOCUMENTS

| | | | | |
|---|---|---|---|---|
| CN | 102470740 A | | 5/2012 | |
| DE | 2649422 A1 | | 5/1977 | |
| DE | 2825726 A1 | | 12/1979 | |
| DE | 3643472 A | | 12/1987 | |
| DE | 19961706 A1 | | 7/2001 | |
| DE | 102006054248 A1 | * | 5/2008 | ............ B60R 13/04 |
| DE | 102008003252 A1 | * | 7/2009 | ............ B60J 10/35 |
| DE | 202008006986 U1 | | 10/2009 | |
| DE | EP 2123497 A1 | * | 11/2009 | ............ B60J 10/02 |
| DE | 102008050130 A1 | | 4/2010 | |
| DE | 102009026369 A1 | | 3/2011 | |
| DE | 102010056495 A1 | * | 7/2012 | ............ B60J 10/18 |
| DE | 202012104621 U1 | * | 3/2014 | ............ B60J 10/18 |
| DE | EP 1763446 B1 | * | 3/2014 | ............ B60J 10/18 |
| DE | 102012112674 A1 | | 6/2014 | |
| DE | 102012112662 A1 | * | 7/2014 | ............ B60J 10/18 |
| DE | 202013103287 U1 | * | 10/2014 | ............ B60J 10/18 |
| DE | EP 3031646 A1 | * | 6/2016 | ............ B60J 10/16 |
| DE | EP 3037291 A1 | * | 6/2016 | ............ B60J 10/30 |
| EP | 1280675 B1 | | 2/2003 | |
| EP | 1361098 A1 | | 11/2003 | |
| EP | 1240041 B1 | | 3/2005 | |
| EP | 1634753 A1 | | 3/2006 | |
| EP | 1724141 A1 | | 11/2006 | |
| FR | 2843227 A1 | | 2/2004 | |
| FR | 2952900 A1 | | 5/2011 | |
| FR | 2966091 A1 | | 4/2012 | |
| FR | 3002495 A1 | * | 8/2014 | ............ B60J 10/70 |
| FR | 3036330 A1 | | 11/2016 | |
| JP | H10151999 A | | 6/1998 | |
| JP | 2002331838 A | | 11/2002 | |
| JP | 2003532574 A | | 11/2003 | |
| JP | 3621919 B2 | * | 2/2005 | ............ B60J 10/18 |
| JP | 3699483 B2 | | 9/2005 | |
| JP | 3776122 B2 | | 5/2006 | |
| JP | 2011508700 A | | 3/2011 | |
| JP | 2012510927 A | | 5/2012 | |
| JP | 2013501672 A | | 1/2013 | |
| JP | 2013086720 A | | 5/2013 | |
| JP | 5367723 B2 | * | 12/2013 | ............ B60J 10/35 |
| JP | 5614894 B2 | * | 10/2014 | ............ B60J 10/02 |
| JP | 2015506877 A | | 3/2015 | |
| JP | 2016516638 A | | 6/2016 | |
| WO | 2004103754 A1 | | 12/2004 | |
| WO | 2006022891 A2 | | 3/2006 | |
| WO | 2010037354 A | | 4/2010 | |
| WO | 2013/120671 A1 | | 8/2013 | |
| WO | 2013128683 A1 | | 9/2013 | |
| WO | 2014177329 A | | 11/2014 | |
| WO | 2014/206782 A1 | | 12/2014 | |

OTHER PUBLICATIONS

Written Opinion issued for International Application No. PCT/EP2014/056409 filed on Mar. 31, 2014 in the name of Saint-Gobain Glass France. Mail date: May 9, 2014 (English translation + German original).

1—International Search Report issued for International Application No. PCT/EP2014/056409 filed on Mar. 31, 2014 in the name of Saint-Gobain Glass France. Mail date: May 9, 2014 (English translation + German original).

International Search Report for PCT Application PCT/EP2013/051179 filed on Jan. 23, 2013 in the name of Saint-Gobain Glass France Mail Date: Mar. 28, 2013. 5 pages. German Original + English Translation.

Written Opinion for PCT Application PCT/EP2013/051179 filed on Jan. 23, 2013 in the name of Saint-Gobain Glass France Mail Date: Mar. 28, 2013. German Original + English Translation.

(56) References Cited

OTHER PUBLICATIONS

Written Opinion for PCT Application PCT/EP2014/062512 filed on Jun. 16, 2014 in the name of Saint-Gobain Glass France. Mail date: Sep. 30, 2014. 16 pages. German Original + English Translation.
Non-Final Office Action for U.S. Appl. No. 14/371,167, filed Jul. 8, 2014 on behalf of Alwin Timmermann. Mail Date: Feb. 23, 2015. 7 pages.
Notice of Allowance for U.S. Appl. No. 14/371,167, filed Jul. 8, 2014 on behalf of Alwin Timmermann. Mail Date: Jul. 6, 2015. 5 pages.
Non-Final Office Action for U.S. Appl. No. 14/892,562, filed Nov. 19, 2015 on behalf of Alwin Timmermann. Mail Date: Dec. 5, 2016. 10 pages.

* cited by examiner

A holding rail (3) is bonded to a pane (1) via an adhesive bond (2).

↓

A guide rail (5) is arranged within a guide channel (8) of a cover (7).

↓

The cover (7) is pressed with a latching rail (9) into a latching channel (4) beyond a latch hook (14) under tensioning of a spring element (11) between the guide rail (5) and a contact surface (12) on the underside of the cover (7).

↓

The cover (7) moves back under relaxation of the spring element (11) and the latch hook (14) is engaged on the latching rail (9).

FIG. 3

SEALING ARRANGEMENT FOR A FIXED VEHICLE WINDOW PANE

CROSS REFERENCE TO RELATED APPLICATIONS

The present application is the U.S. national stage entry of International Patent Application No. PCT/EP2014/056409, filed internationally on Mar. 31, 2014, which, in turn, claims priority to European Patent Application No. 13165908.8, filed on Apr. 30, 2013.

The invention relates to a sealing arrangement for motor vehicle window panes, a method for its production, and its use.

Motor vehicles must, as a rule, be protected, in the region between the windshield and the engine body, against moisture, airflow generated by driving, and penetrating dirt. At the same time, the glass body of the windshield must be sealed relative to the metal car body. In the transition region, water boxes made of plastic are also often used. Water boxes protect splash-water-sensitive components in the motor vehicle against moisture. The water box cover enables draining of the water accumulating on the windshield. However, the materials glass, various plastics, and metal have significantly different properties that make special considerations necessary during sealing. In order to nevertheless enable sealing, particularly in the critical region of the water box, polymeric materials such as rubber gaskets are often used. The water box seal often assumes this role. It must be stable, resistant, and also simple to install. The water box seal is usually produced by extrusion methods, the fixing on the components by suitable adhesives and adhesive systems.

DE 199 61 706 A1 discloses an arrangement for joining a fixedly installed windshield to a car body component, in particular to a water box. The arrangement comprises a shaped strip with a lip adhering to the vehicle window. The lip has, on its underside, means for joining to a component.

DE 10 2009 026 369 A1 discloses a sealing arrangement for motor vehicle window panes. It comprises a holding rail, a pane, and a cover connected via a connection point to a latching rail. The holding rail comprises a latching channel that is formed with a spring leg and support body. The cover is engaged with the latching rail in the latching channel and a spring element is arranged between the contact surface of the cover and the support body.

EP 1 280 675 B1 likewise discloses a sealing arrangement for motor vehicle window panes. It comprises a cover of the water box and a lowerable and raisable arrangement of a window washer.

In order to to be able to obtain high leak-tightness and stability of the sealing arrangement, in particular perfectly fitting locking, very precise production is required. If the components produced deviate only slightly from the production specifications, very high forces are frequently required for locking the components. Depending on the deviation, even only limited sealing can result. High locking forces and production tolerances can also negatively affect the positioning accuracy of the sealing arrangement.

The object of the invention consists in providing a sealing arrangement for motor vehicle window panes that is less sensitive to production tolerances and requires only low forces for durable and secure locking of the individual components.

The object of the present invention is accomplished according to independent claim 1. Preferred embodiments emerge from the subclaims.

A method according to the invention for producing an arrangement for sealing motor vehicle window panes as well as its use emerge from other independent claims.

The sealing arrangement for a vehicle window pane according to the invention comprises at least
a holding rail with a latching channel. The latching channel is formed and delimited by a guide rail and a spring leg. The holding rail is affixed on a window pane. The fastening of the holding rail can be done via an adhesive or an adhesive tape. In an optional embodiment of the invention, the contact surface of the adhesive bond can be pretreated, for example, with a primer or a plasma treatment of the holding rail. The holding rail functions as a connecting piece between the pane and the car body component.

The arrangement according to the invention further comprises a cover, in particular a water box cover, with a guide channel, wherein the guide channel is formed by a latching rail and a positioning stop. The guide rail is arranged in the guide channel, while, simultaneously, the latching rail is engaged in the latching channel, and the spring leg is latch connected to the latching rail. In the guide channel, a spring element is tensioned between a contact surface on the underside of the cover and the guide rail. The spring element is implemented, in cross-section, as a single lip, preferably finger-shaped or tongue-shaped. Together with the guide rail, the spring element seals the contact surface, preferably completely, on the underside of the cover between the positioning stop and the latching rail and, at the same time, supports the latching rail. The spring element preferably has high specific stiffness. The spring element seals the latching channel against the outside atmosphere. The spring element is compressed during insertion of the latching rail and pressed against the positioning stop. Together with the guide rail, the spring element centers the cover between the positioning stop and the latching rail. Centering by means of the locking arrangement made up of the spring leg and the latching rail is no longer necessary. The spring leg, relieved of the task of centering, can thus be implemented particularly flexible and can thus compensate production tolerances in the region of the guide channel.

The spring element preferably includes elastomers and/or thermoplastic elastomers, preferably includes polyurethanes, polyolefins, polysulfides, polyepoxides, and rubber, such as natural rubber, nitrile rubber (NBR), styrene butadiene rubber, butadiene acrylonitrile rubber, ethylene propylene diene rubber, silicones, such as RTV—(room-temperature-vulcanizing silicone rubber), HTV—(high-temperature-vulcanizing) silicone rubber, peroxide-vulcanizing silicone rubber, and/or addition-vulcanizing silicone rubber, polyacrylates, styrene/butadiene block copolymers (SBS), and/or ethylene-propylene-diene rubber (EPDM).

The spring element is preferably implemented as a (partially) hollow body, a porous solid body, or as a solid body. The different design of the spring element enables additional variation and control of stability, weight, and elasticity.

The spring element preferably has a Shore hardness of Shore A 40 to Shore A 90, preferably Shore A 50 to Shore A 75. The Shore hardness according to the invention enables a reversible but simultaneously firm and leakproof sealing of the contact surface.

The spring element preferably has a length of 2 mm to 8 mm, preferably 3 mm to 6 mm. This length enables optimum sealing and centering of the spring element. If a greater length were selected, the supporting action can decrease; with a shorter length, the sealing can be partially limited. The spring element preferably has a diameter at the foot point of 0.5 mm to 3 mm, particularly preferably 1 mm to 2 mm. The "foot point" refers to the zone of the contact region of the spring element with the guide rail. The spring element preferably has a diameter on the free end of 0.2 mm to 1.5 mm, preferably from 0.5 mm to 1 mm. Particularly in combination with a Shore hardness of the spring element from Shore A 40 to Shore A 90, the dimensions mentioned improve the simultaneous supporting, sealing, and, especially, centering action of the spring element.

The holding rail and/or the guide rail preferably contain a reinforcing insert. The reinforcing insert increases the stability of the holding rail and enables further regulation of the stability. The reinforcing insert preferably includes metals, organic polymers, or composite materials.

The spring leg preferably has a latch hook. The latch hook is preferably implemented barb-shaped and improves the locking and anchoring of the spring leg with the latching rail. The latch hook preferably has a rounded surface, which implies simpler engagement with the latching rail with simultaneously higher stability against subsequent loosening of the locking.

The spring leg and the latching rail are preferably (in juxtaposition) aligned locked parallel to each other. The parallel arrangement, preferably with recesses or bulges on the latching rail as well as a latch hook on the spring leg surprisingly improves the stability of the connection between the spring leg and the latching rail. The geometric fit of the recesses or bulges on the latch hook is preferably coordinated with each other. The latch hook has, for better engagement, a rounded surface preferably on the side facing the latching rail. The rounded surface improves the engagement and reduces the resistance in the engagement direction.

The holding rail is preferably bonded to the pane via an adhesive bond. The adhesive bond enables a simple, stable, and durable fastening of the pane on the holding rail and through it on the mounting part. The adhesive bond preferably comprises or contains acrylate adhesives, methyl methacrylate adhesives, cyanoacrylate adhesives, polyepoxides, silicone adhesives, and/or silane-curing polymer adhesives, as well as mixtures and/or copolymers thereof. The contact surface of the adhesive bond with the pane or holding rail can, optionally, be pretreated, for example, with a primer or a plasma treatment.

The adhesive bond preferably comprises a double-sided adhesive tape. The double-sided adhesive tape enables quick and precise fixing of the pane on the holding rail. Curing of the adhesive is, as a rule, unnecessary. Dosing of the adhesive is also eliminated.

The spring leg can include a metal or plastic insert, for example, a metal foil or a metal spring. The spring leg preferably includes no metal or plastic insert and gets its flexibility from the material of the spring leg itself. Spring legs without a metal or plastic insert are particularly simple to produce.

The latching rail preferably includes recesses or bulges. These structural elements enable and ensure the engagement and locking of the spring leg to the latching rail and, thus, the fixing of the mounting part, for example, a water box, on the pane. In addition, recesses increase the flexibility of the latching rail.

The spring leg is preferably deflectable or deflectably connected to the holding rail. Depending on the deflection force, the connection between the mounting part and the pane can be reversibly or irreversibly locked.

The guide rail preferably has a supporting bulge, which supports and improves the sealing of the latching channel. The precise dimensioning of the supporting bulge is governed by the size of the guide channel and can be readily adapted thereto and varied as needed.

The positioning stop is preferably arranged parallel to the latching rail. In the context of the invention, the term "parallel" also includes an averaged angular deviation of plus/minus 15°. The parallel arrangement of the positioning stop improves the sealing action of the spring element and the stability as well as the fixing on the contact surface.

The invention further comprises a method for producing a sealing arrangement. In a first step, a holding rail is bonded to a pane via an adhesive bond. In a following step, a guide rail is arranged within a guide channel of a cover. In parallel or subsequently, the cover is pressed with a latching rail into a latching channel beyond a latch hook under tensioning of a spring element between the guide rail and a contact surface on the underside of the cover. In the next step, the cover is moved back under relaxation of the spring element, engaging the latch hook on the latching rail.

The invention further comprises the use of a sealing arrangement according to the invention as a windshield or rear window, preferably as a water box cover of a windshield.

In the following, the invention is explained in detail with reference to drawings. The drawings are a purely schematic representation and not true to scale. They in no way restrict the invention.

Figure 2:
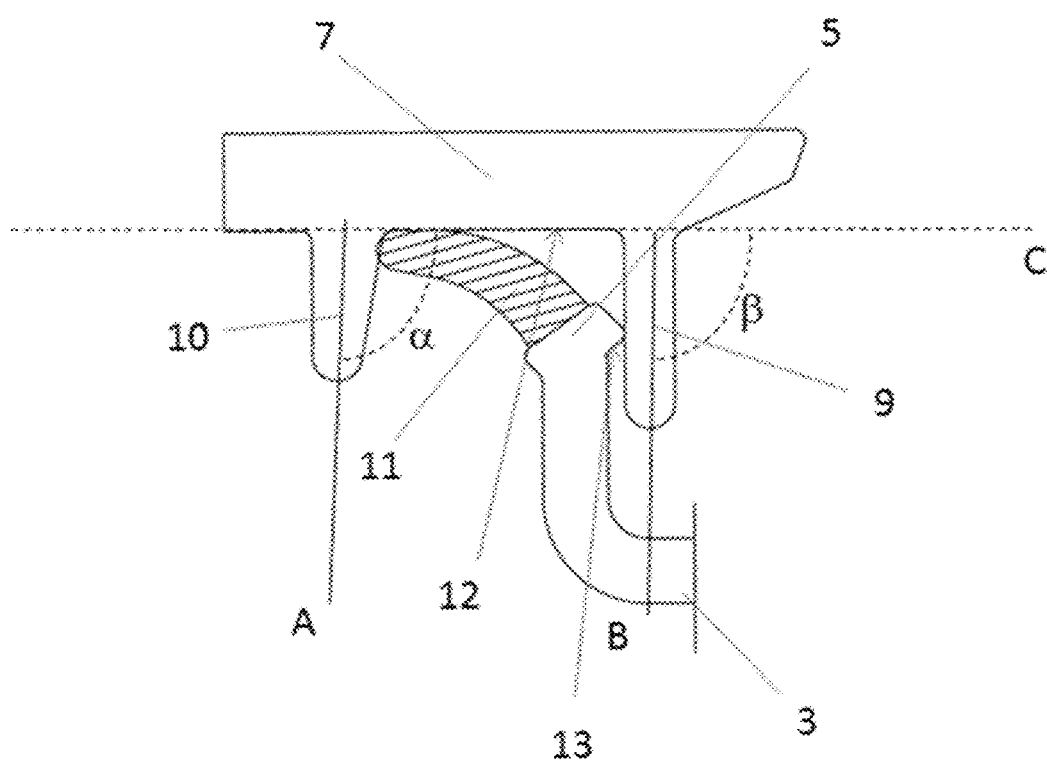

They depict:

FIG. 1 a cross-section of the sealing arrangement according to the invention,

FIG. 2 an enlarged cross-section of the locked spring element, and

FIG. 3 a flowchart of the method according to the invention for producing the sealing arrangement.

FIG. 1 depicts a cross-section of the sealing arrangement according to the invention. A pane (1), preferably a composite glass pane, is bonded to a holding rail (3) via an adhesive bond (2). The holding rail (3) serves to connect a motor vehicle component, preferably a water box, to the pane (1). The holding rail (3) comprises a latching channel (4), wherein the latching channel (4) is formed from a guide rail (5) and a spring leg (6). The holding rail (3) includes a reinforcing insert (15). The reinforcing insert preferably includes metals and elastic plastics and can, optionally, also increase the stiffness of the holding rail (3). A cover (7), preferably of a water box, forms, with a latching rail (9) and a positioning stop (10), a guide channel (8). The guide rail (5) implemented as part of the holding rail (3) is arranged in the guide channel (8) and seals the guide channel (8) with a spring element (11). At the same time, the latching rail (9) is engaged in the latching channel (4) on a spring leg (6) and provides for secure fixing of the cover (7). In the guide channel (8), the spring element (11), preferably in the form of a polymeric, rubber-containing, elastic lip, is tensioned between a contact surface (12) on the underside of the cover (7) and the guide rail (5). The spring element (11) is preferably implemented, in cross-section, as a single, finger-shaped lip without additional recesses or protrusions. As described above, the spring element (11), together with the guide rail (5) and preferably a supporting bulge (13), seals the contact surface (12) on the underside of the cover (7) between the positioning stop (10) and the latching rail (9). At the same time, the spring element (11) supports the cover (7) on the latching rail (3).

FIG. 2 depicts an enlarged cross-section of the locked spring element. The region of the cover (7) shown includes the positioning stop (10) and the latching rail (9). The contact surface (12) is formed by the intermediate space between the positioning stop (10) and the latching rail (9). The positioning stop (10) and the latching rail (9) are arranged parallel to each other. In the context of the invention, "parallel" also includes an averaged angular deviation between the contact surface (12) and the averaged imaginary straight lines A and B by the positioning stop (10) and the latching rail of as much as 30°. Preferred here is an arrangement of the straight lines A and B opening away from the contact surface (12). The angle α (alpha) between the plane (C) of the contact surface (12) and the straight line A is, consequently, preferably from 90° to 120°; the angle β (beta) between the plane (C) of the contact surface (12) and the straight line B is preferably from 60° to 90°. The spring element (11) is preferably implemented, in cross-section, finger-shaped or tongue-shaped and seals, together with the guide rail (5) and the supporting bulge (13), the contact surface (12) and the space on the right (not shown in the figure) between the cover (7) and the pane (1) (not shown). At the same time, the spring element (11) preferably has a Shore hardness from Shore A 50 to Shore A 75 as well as a length of 3 mm to 6 mm. The spring element compressed in the installed state presses against the positioning stop (10) and the latching rail (9) and thus enables centering without actual locking. In addition, the spring element is so flexible that it can compensate production tolerances in the guide channel.

FIG. 3 depicts a flowchart of the method according to the invention for producing the sealing arrangement. In a first step, a holding rail (3) is bonded to a pane (1) via an adhesive bond (2) in the form of a double-sided adhesive tape. In a following steps, a guide rail (5) is arranged within a guide channel (8) between a positioning stop (10) and a latching rail (9) of a cover (7). Then, the cover (7) is pressed with a latching rail (9) into a latching channel (4) beyond a latch hook (14) under tensioning of a spring element (11) between the guide rail (5) and a contact surface (12) on the underside of the cover (7). In the following step, the cover (7) is moved back under relaxation of the spring element (11) and with the engagement of the latch hook (14) on the recesses or bulges (16) of the latching rail (9).

LIST OF REFERENCE CHARACTERS (1) pane
(2) adhesive bond
(3) holding rail
(4) latching channel
(5) guide rail
(6) spring leg
(7) cover
(8) guide channel
(9) latching rail
(10) positioning stop
(11) spring element
(12) contact surface
(13) supporting bulge
(14) latch hook
(15) reinforcing insert
(16) recesses or bulges

The invention claimed is:

1. A sealing arrangement for a motor vehicle window pane, comprising:
a holding rail configured with a guide rail and a spring leg, wherein the guide rail is positioned adjacent the spring leg so as to form a latching channel, and
wherein the holding rail is affixed on a window pane;
a cover configured with a latching rail and a positioning stop so as to form a guide channel,
wherein the guide rail is arranged in the guide channel and the latching rail is arranged in the latching channel, and
wherein the spring leg is latch connected to the latching rail; and
a spring element arranged in the guide channel between the positioning stop and the latching rail,
wherein the spring element is tensioned between the guide rail and a contact surface on an underside of the cover, and
wherein, in an installed state of the sealing arrangement, the spring element is pressed against the positioning stop.

2. The sealing arrangement according to claim 1, wherein the spring element is implemented as a single lip in cross-section and, together with the guide rail, seals and supports the contact surface on the underside of the cover.

3. The sealing arrangement according to claim 1, wherein the spring element is implemented as a partially hollow body, a porous solid body, or as a solid body.

4. The sealing arrangement according to claim 1, wherein the spring element has a Shore hardness from Shore A 40 to Shore A 90.

5. The sealing arrangement according to claim 1, wherein the spring element has a Shore hardness from Shore A 50 to Shore A 75.

6. The sealing arrangement according to claim 1, wherein the spring element has a length of 2 mm to 8 mm.

7. The sealing arrangement according to claim 1, wherein the spring element has a length of 3 mm to 6 mm.

8. The sealing arrangement according to claim 1, wherein the holding rail includes a reinforcing insert.

9. The sealing arrangement according to claim 1, wherein the guide rail includes a reinforcing insert.

10. The sealing arrangement according to claim 1, wherein the holding rail is bonded to the window pane via an adhesive bond.

11. The sealing arrangement according to claim 10, wherein the adhesive bond comprises a double-sided adhesive tape.

12. The sealing arrangement according to claim 1, wherein the spring leg includes a metal or plastic insert.

13. The sealing arrangement according to claim 1, wherein the spring leg includes a metal foil insert.

14. The sealing arrangement according to claim 1, wherein the spring leg comprises a latch hook.

15. The sealing arrangement according to claim 1, wherein the spring leg and the latching rail are aligned parallel to each other.

16. The sealing arrangement according to claim 1, wherein the latching rail has recesses or bulges.

17. The sealing arrangement according to claim 1, wherein the spring leg is deflectable.

18. The sealing arrangement according to claim 1, wherein the guide rail has a supporting bulge.

19. A method for producing a sealing arrangement, comprising:
bonding a holding rail configured to a window pane via an adhesive, the holding rail comprising a guide rail and a spring leg forming a latching channel and the spring leg comprising a latch hook;
arranging the guide rail within a guide channel that is formed between a latching rail and a positioning stop of a cover;
pressing the latching rail into the latching channel beyond the latch hook under tensioning of a spring element positioned between the guide rail and a contact surface on an underside of the cover;

relaxing the spring element so that the latch hook is engaged on the latching rail, and pressing the spring element against a positioning stop, thereby centering the cover between the positioning stop and the latching rail.

\* \* \* \* \*